UNITED STATES PATENT OFFICE.

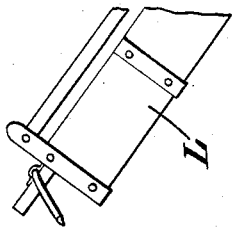
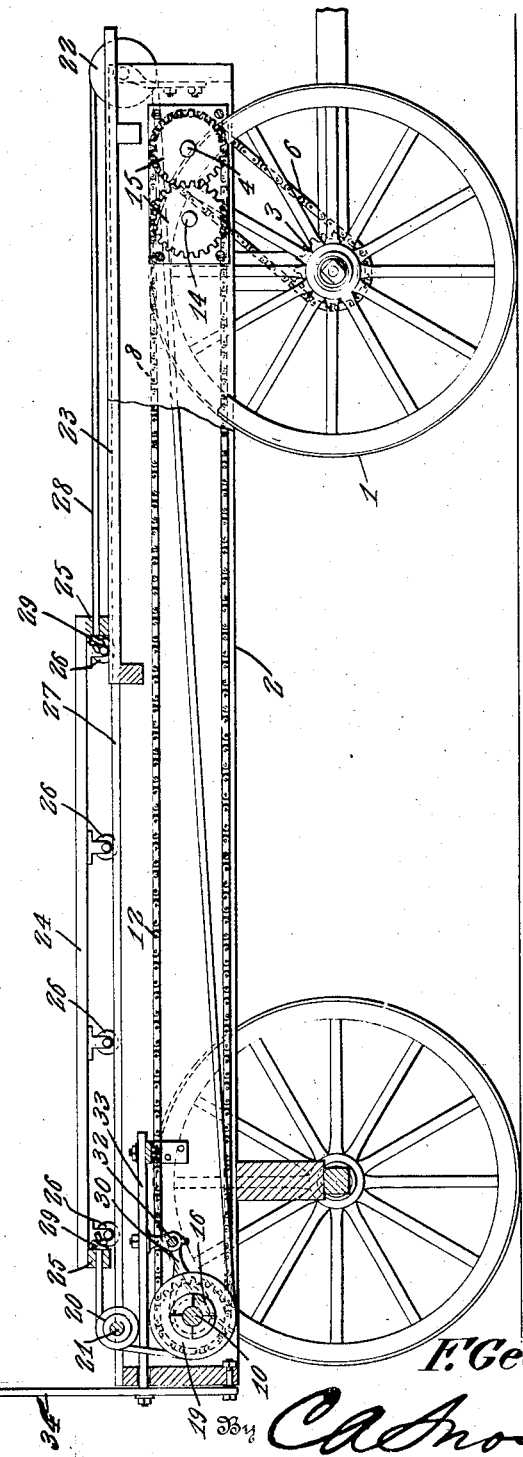

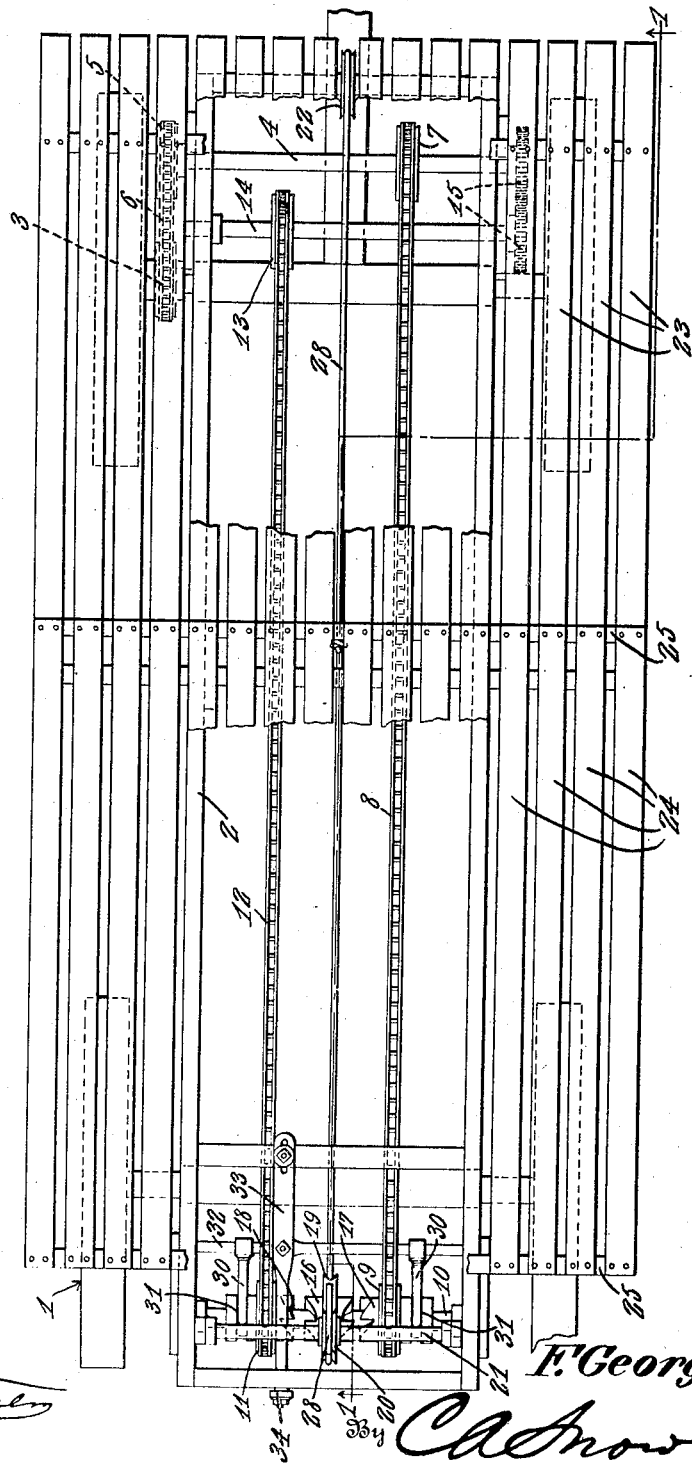

FRANK GEORGESON, OF REDGRANITE, WISCONSIN.

HAYRACK.

1,353,229.　　　　　　　Specification of Letters Patent.　　Patented Sept. 21, 1920.

Application filed February 24, 1919.　Serial No. 278,876.

*To all whom it may concern:*

Be it known that I, FRANK GEORGESON, a citizen of the United States, residing at Redgranite, in the county of Waushara and State of Wisconsin, have invented a new and useful Hayrack, of which the following is a specification.

This invention relates to hay racks, one of its objects being to provide a rack having a shiftable load supporting section which, after being loaded, can be moved with its load to another position on the structure, thereby leaving another section of the rack clear to receive its load, with the result that the material is loaded evenly over the length of the rack.

Another object is to provide a rack which is simple and durable in construction, and can be controlled readily by the user.

With the foregoing and other objects in view which will appear as the description proceeds, the invention consists of certain novel details of construction and combinations of parts which will be hereinafter more fully described and pointed out in the claim, it being understood that various changes may be made in the construction and arrangement of the parts without departing from the spirit or sacrificing any of the invention as set forth in the appended claim.

In the accompanying drawings the preferred form of the invention has been shown.

In said drawings

Figure 1 is a view partly in side elevation and partly in section, said view being taken on the line 1—1, Fig. 2.

Fig. 2 is a plan view, certain parts being broken away.

Referring to the figures by characters of reference, 1 designates the running gear of a body 2, there being a sprocket 3 connected to and adapted to rotate with one of the wheels of the running gear. A transverse shaft 4 is journaled in one end of the body and has a sprocket 5 secured thereto which receives motion through a chain 6 from the sprocket 3. Another sprocket 7 is secured to the shaft 4 and transmits motion through an endless chain 8 to a sprocket 9 which is slidably and revolubly mounted on a transverse shaft 10 journaled in the other end of the body 2. Another sprocket 11 is slidably and revolubly mounted on the shaft 10 and is adapted to be rotated by an endless chain 12 mounted on a sprocket 13 secured to a transverse shaft 14 close to and parallel with the shaft 4. Gears 15 are secured to the shafts 4 and 14 and are constantly in mesh so that the two shafts 4 and 14 rotate simultaneously in opposite directions respectively and correspondingly rotate the sprockets 9 and 11.

Secured to the shaft 10 between the sprockets 9 and 11 is a two-faced clutch 16 and clutch members 17 are located at the inner sides of the sprockets 9 and 11, as shown at 17 and 18. Thus it will be seen that by placing clutch member 17 in engagement with the clutch 16 shaft 10 will be rotated in one direction and, by placing member 18 in engagement with the clutch 16 the shaft will be rotated in the opposite direction. Under normal conditions the clutch members are disengaged and the shaft 10 is stationary.

A pulley 19 is revoluble with the clutch member 16 and another pulley 20 is supported thereabove by a shaft 21. A pulley 22 is mounted at the opposite end of the body 1.

A rack section consisting of a series of parallel slats 23 is secured fixedly to one end portion of the body 2, said section being extended laterally beyond the sides of the body as shown. Another movable section consisting of parallel slats 24 connected by transverse strips 25 is mounted on the other end portion of the body, the two sections, when extended one beyond the other, completely covering the body and, when in their initial positions resting one upon the other over one half of the body. The movable section has rollers 26. Longitudinally channeled rails 27 are secured to the sides of the body and constitute guides for the rollers 26. A cable 28 is extended under the pulleys 22 and 19, one end extending over the pulley 20 and both ends being extended toward each other and secured, as at 29, to the respective ends of the movable section of the rack.

For the purpose of shifting the clutch members 17 and 18 forked arms 30 are seated in annular grooves 31 in said members. These arms are fastened to a slide 32 to which is connected the intermediate portion of a lever 33. One end of the lever is pivotally connected to the body 2 while its other end is connected to an actuating lever 34. Thus it will be seen that when the lever is shifted in one direction the parts will be coupled together so as to drive the cable 28 and move the rack section 24 into position on the section 23 and, when moved in the opposite direction the operation of the cable will be reversed and the section 24 will be drawn off of the section 23.

Under normal conditions the sections 23 and 24 are superposed and the shaft 10 is disconnected from the driving mechanism. Thus when the rack is moved along and material is deposited thereon from a loader L the material will be piled on the section 24. After said section has been loaded the shaft 10 can be coupled to the proper sprocket thereon so as to cause the pulley 19 to rotate and actuate the cable. The section 24 with the load thereon is thus drawn rearwardly as the rack moves forwardly, bringing the previously deposited material to the other end of the rack and leaving the section 23 exposed to receive an additional supply of material. Thus the load on the rack will be distributed throughout the length of the rack.

The section 24, after being unloaded can be brought back to initial position as hereinbefore pointed out.

What is claimed is:—

The combination with a wheel supported body and a stationary rack section at the delivery end of the body, of channeled rails secured to the sides of and extending throughout the length of the body, a movable rack section, wheels supporting the same and movable along the channeled rails, said wheels supporting the movable rack section above so as to move to position over the stationary rack section, the two rack sections constantly lapping, a flexible element secured at its ends to the respective ends of the movable rack section and extending longitudinally within the body, guides for said flexible element and adjacent the ends of the body, a transverse shaft, a member loosely mounted on the shaft and engaging and adapted to actuate said flexible element, clutch members at opposite sides of said loose member and separately shiftable into engagement therewith, means operated by the forward movement of the wheel supported body for actuating one of the clutch members in one direction, and means operated by the forward movement of the wheel supported body for actuating the other clutch member in the opposite direction, and means for shifting either of said clutch members into engagement with the loose member on the shaft whereby said member can be rotated in either direction to shift the movable rack section in either direction upon the rails.

In testimony that I claim the foregoing as my own, I have hereto affixed my signature in the presence of two witnesses.

FRANK GEORGESON.

Witnesses:
 JOHN F. KUHR,
 P. J. JORGENSEN.